W. H. HOLDEN.
Loose Pulleys.
No. 150,418.        Patented May 5, 1874.
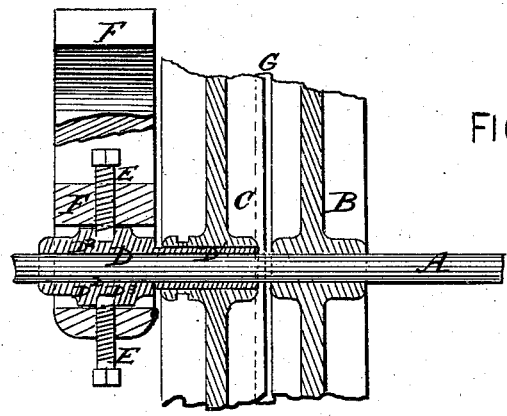
FIG. 1.
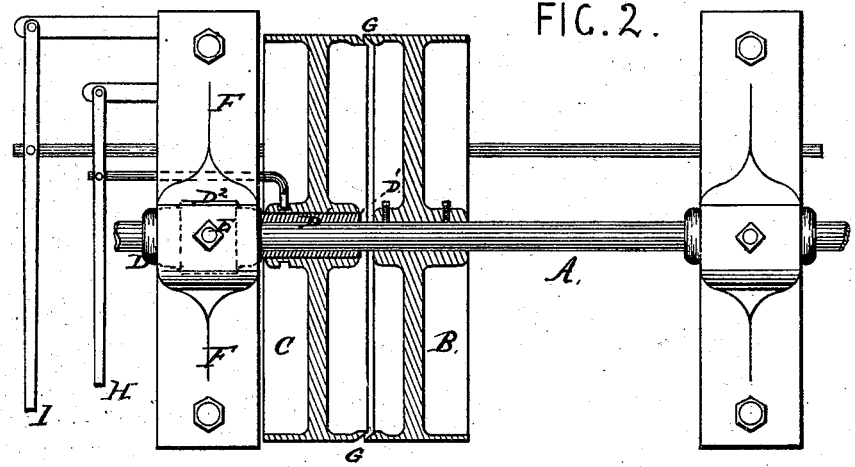
FIG. 2.
FIG. 3.
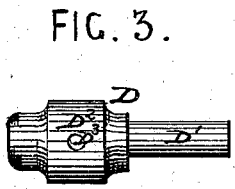
WITNESSES  
J. Mason Goszler  
Colborne Brookes
INVENTOR  
Willis H. Holden  
By Jas. B. Gardner  
Attorney

UNITED STATES PATENT OFFICE.

WILLIS H. HOLDEN, OF FITCHBURG, MASSACHUSETTS, ASSIGNOR OF ONE-HALF HIS RIGHT TO THOMAS C. SHELDON, OF SAME PLACE.

IMPROVEMENT IN LOOSE PULLEYS.

Specification forming part of Letters Patent No. 150,418, dated May 5, 1874; application filed October 29, 1873.

*To all whom it may concern:*

Be it known that I, WILLIS H. HOLDEN, of Fitchburg, in the county of Worcester and State of Massachusetts, have invented an Improvement in Loose Pulleys, of which the following is a specification:

This invention relates to improvements in the means of supporting and arranging the loose pulleys employed in driving machinery.

In carrying out my invention, the loose pulley is mounted on a hub or bearing projecting from a tubular axle-box, the exterior surface of which is of unequal diameter, being provided with an enlarged rim or flange formed thereon, which is provided with two circular recesses therein, for the reception of retaining-screws carried by the bracket supporting the driving-shaft, upon which the fast pulley is affixed.

In the accompanying drawings, Figure 1 represents a portion of a plan in section, and Fig. 2 a front view, partly in section, of apparatus arranged according to my invention. Fig. 3 is a separate view of the axle-box D.

A is the driving-shaft, upon which the fast pulley B is mounted and secured. C represents a loose pulley, which is mounted on a hub or bearing, $D^1$, projecting from a tubular axle-box, D, the exterior surface of which is of unequal diameter, being provided with an enlarged rim or flange, $D^2$, formed thereon, which is provided with two circular recesses, $D^3$, therein, for the reception of retaining-screws E, carried by the bracket F, supporting the axle-box D, which is bored to receive and support the driving-shaft A. The flanges of the pulleys B C, on their adjacent sides, are beveled, as shown at G, so that when the belt is required to be shifted from the loose pulley C onto the fast pulley B, the pulley C may be caused to revolve with the pulley B by shifting it slightly endwise by means of the shipper H, thereby facilitating the removal of the belt from one pulley to the other.

When the belt is required to be shifted from the tight pulley B onto the loose pulley C, the said pulleys are not drawn together, the position of the belt being simply shifted by means of the shipper I.

Having thus described my invention, what I claim, and desire to secure by Letters Patent, is—

The combination, with a loose pulley, C, of a tubular axle-box, D, having a hub or bearing, $D^1$, an enlarged flange, $D^2$, and recesses $D^3$, all constructed substantially as and for the purpose described.

WILLIS H. HOLDEN.

Witnesses:
  GEO. RAYMOND,
  O. W. RUGG.